W. F. COCHRANE.
Harvester.
No. 46,180. Patented Jan'y 31, 1865.
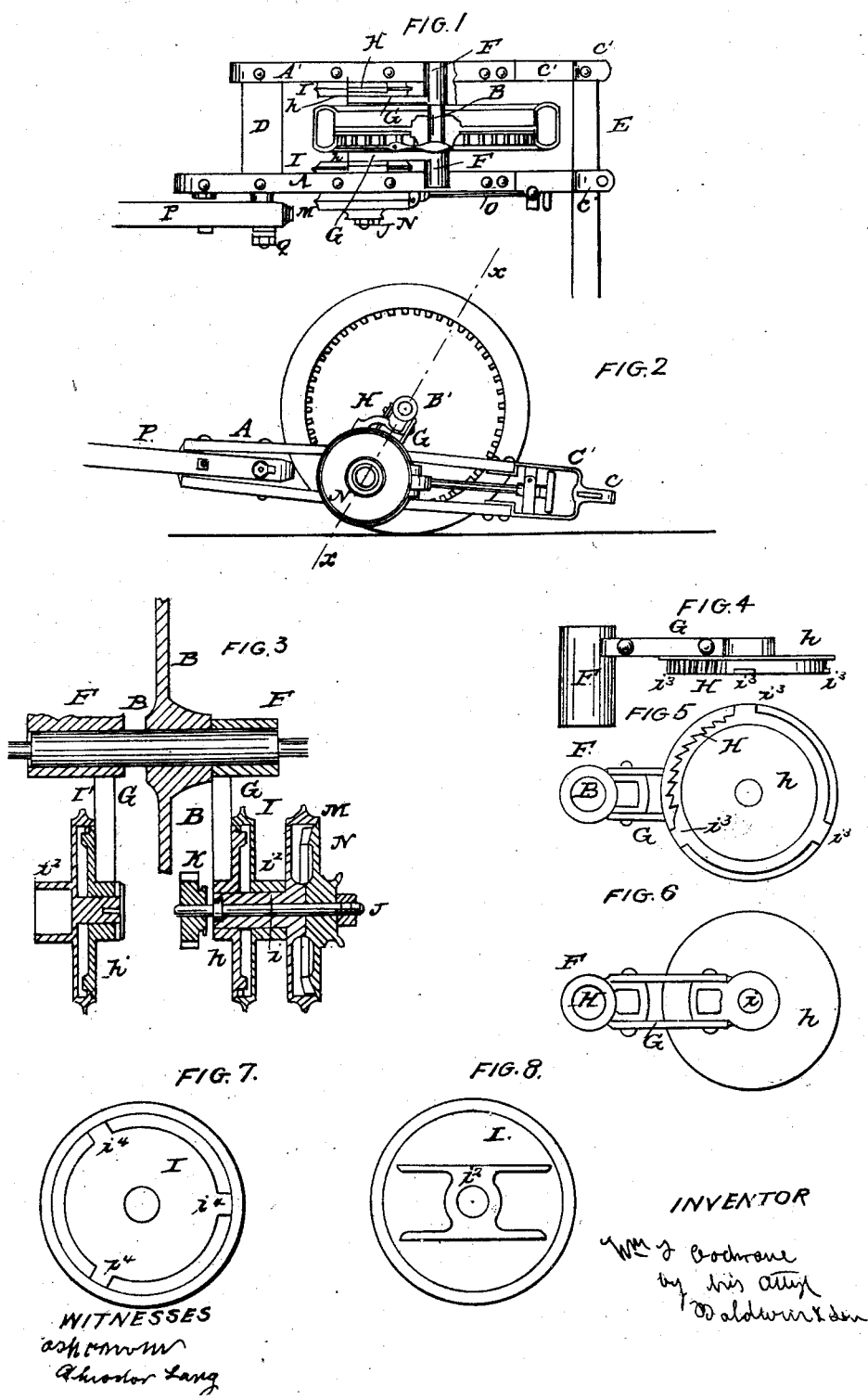

UNITED STATES PATENT OFFICE.

WM. F. COCHRANE, OF SPRINGFIELD, OHIO, ASSIGNOR TO HIMSELF AND WARDER & CHILD, OF SAME PLACE.

IMPROVEMENT IN HARVESTERS.

Specification forming part of Letters Patent No. 46,180, dated January 31, 1865.

*To all whom it may concern:*

Be it known that I, WILLIAM F. COCHRANE, of Springfield, in the county of Clarke and State of Ohio, have invented a new and useful Improvement in Harvesters, of which the following is a full, clear, and exact description, reference being had to the accompanying drawings, which make part of this specification, and in which—

Figure 1 represents a plan or top view of so much of a harvester embracing my improvements as is necessary to illustrate my invention, the driving-wheel being shown in section. Fig. 2 represents a view in elevation of the gearing side of the same. Fig. 3 represents a section through the same at the line $x\ x$ of Fig. 2. Figs. 4, 5, and 6 represent, respectively, edge and side views of the pipe-boxes, radius-bars, and disks which connect the main frame and driving-wheel. Figs. 7 and 8 represent views of the shell-brackets in which the disks turn. Figs. 1 and 2 are on a scale of one-half that of the others.

In the accompanying drawings, which exemplify one mode of carrying out the objects of my invention, the main frame is shown as consisting of two side beams, A A', united by a cross-beam or tool-box, D, in front, and by the heel of the finger-beam E in rear.

The driving-wheel B is mounted and turns on a tubular axis, B', screwed to the pipe-boxes F of the radius-bars G. Disks $h$, secured to the radius-bars G, turn on bearings $i\ i'$, forming part of the shell-brackets I I', which have broad bearings $i^2$, inserted between and firmly secured to the frame. The disks are provided on their inner faces with small projections or bosses $i^3$, which enter corresponding notches, $i^4$, in the flanges of the brackets I I', and thus lock the disks and brackets securely together, while permitting the disks to move freely within the brackets.

Ratchets H are cut upon the rims of the disks $h\ h'$, and engage with the teeth of pawls H', pivoted to the shell-brackets I I', by which means the frame can be held at any desired height from the ground. The bracket I is somewhat differently constructed from the other one, I', being made with a tubular bearing through which the bearing $i$ of the gear-bracket M passes. This bearing $i$ is also tubular and forms the journal of the counter-shaft J, which passes through it, and carries on one end a pinion, K, deriving motion from the spur-wheel L, and on the other a bevel-wheel, N, which drives the crank-shaft O.

It is deemed unnecessary here to describe in detail the other parts of the machine, as they form no part of the subject-matter herein claimed, and one, moreover, fully described in other applications filed simultaneously with this, and marked, respectively, "A," "B," "C," and "E."

By the above-described mode of construction a wide range of motion in raising and lowering the machine can be secured; the driving-wheel can be as rigidly held as if secured directly to the frame; the frame can be easily raised and lowered; the ratchets are protected from becoming clogged, and a firm bearing is secured for the counter-shaft.

What I claim herein as new, and desire to secure by Letters Patent, is—

1. The combination of the driving-wheel, tubular axle, sleeved radius-bars, and the main frame, substantially as and for the purposes described.

2. The shell-brackets I I', constructed and combined substantially as and for the purpose described.

3. The combination of the shell-brackets and main frame, substantially as and for the purpose set forth.

4. The combination of the radius-bars, shell-brackets, and pawls and ratchets, substantially as described, for the purpose of holding the frame at any desired elevation, as set forth.

In testimony whereof I have hereunto subscribed my name.

WM. F. COCHRANE.

Witnesses:
A. F. FOLGER,
GEO. D. W. GREEN.